(12) United States Patent
Mukkara et al.

(10) Patent No.: US 9,141,785 B2
(45) Date of Patent: Sep. 22, 2015

(54) TECHNIQUES FOR PROVIDING TENANT BASED STORAGE SECURITY AND SERVICE LEVEL ASSURANCE IN CLOUD STORAGE ENVIRONMENT

(75) Inventors: Umasankar Mukkara, Bangalore (IN); Felix Xavier, Bangalore (IN); Srivibhavan Balaram, Bangalore (IN); Shailesh Bam, Chaitraban Bibvewadi (IN)

(73) Assignee: CloudByte, Inc., Cupertino, CA (US)

( * ) Notice: Subject to any disclaimer, the term of this patent is extended or adjusted under 35 U.S.C. 154(b) by 214 days.

(21) Appl. No.: 13/558,626

(22) Filed: Jul. 26, 2012

(65) Prior Publication Data

US 2013/0036449 A1   Feb. 7, 2013

(30) Foreign Application Priority Data

Aug. 3, 2011   (IN) ............................ 2660/CHE/2011

(51) Int. Cl.
*G06F 21/53* (2013.01)
*G06F 9/50* (2006.01)

(52) U.S. Cl.
CPC .............. *G06F 21/53* (2013.01); *G06F 9/5072* (2013.01)

(58) Field of Classification Search
CPC ...................................................... G06F 21/53
See application file for complete search history.

(56) References Cited

U.S. PATENT DOCUMENTS

| | | | |
|---|---|---|---|
| 7,823,009 B1 * | 10/2010 | Tormasov et al. | 714/6.12 |
| 8,112,757 B2 * | 2/2012 | Alford, Jr. | 718/104 |
| 8,346,742 B1 * | 1/2013 | Juels et al. | 707/698 |
| 8,352,611 B2 * | 1/2013 | Maddhuri et al. | 709/226 |
| 8,352,941 B1 * | 1/2013 | Protopopov et al. | 718/1 |
| 8,370,312 B1 * | 2/2013 | Sawhney et al. | 707/694 |
| 8,578,076 B2 * | 11/2013 | van der Linden et al. | 710/72 |
| 8,805,951 B1 * | 8/2014 | Faibish et al. | 709/213 |
| 8,849,955 B2 * | 9/2014 | Prahlad et al. | 709/219 |
| 2010/0199037 A1 * | 8/2010 | Umbehocker et al. | 711/113 |
| 2010/0235630 A1 * | 9/2010 | Carter et al. | 713/162 |
| 2011/0022812 A1 * | 1/2011 | van der Linden et al. | 711/163 |
| 2011/0113474 A1 * | 5/2011 | Chandolu et al. | 726/4 |
| 2011/0153824 A1 * | 6/2011 | Chikando et al. | 709/226 |

OTHER PUBLICATIONS

Hwang et al.; Trusted Cloud Computing with Secure Resources and Data Coloring; Published in: Internet Computing, IEEE (vol. 14 , Issue: 5 ); pp. 14-22; Date of Publication: Sep.-Oct. 2010; IEEE Xplore.*

Hansen et al.; Lithium: virtual machine storage for the cloud; Published in: Proceeding SoCC '10 Proceedings of the 1st ACM symposium on Cloud computing; pp. 15-26; 2010; ACM Digital Library.*

* cited by examiner

*Primary Examiner* — Bradley Holder
(74) *Attorney, Agent, or Firm* — Schwegman Lundberg & Woessner, P.A.

(57) ABSTRACT

Techniques for tenant-bases storage security and service level assurances in a cloud environment are presented. A Tenant Storage Machine (TSM) for each tenant uses a unique identifier. The TSM is dynamically allocated with operating system resources to run processes based on agreed service level assurances. The service level assurances are stored in a Service Level Assurance (SLA) policy store. The TSM communicates with the SLA policy store via a TSM bus to acquire a SLA policy configured for the tenant and based on which resources are dynamically allocated. Processes running under the TSM run with root privileges to provide security.

13 Claims, 5 Drawing Sheets

FIG. 5 ically allocated based on service level assurance (SLA) policies for the tenant; the OS resources accessible from within the TSM. Finally, the request is processed within the TSM using the OS resources and in accordance with the SLA policies.

TECHNIQUES FOR PROVIDING TENANT BASED STORAGE SECURITY AND SERVICE LEVEL ASSURANCE IN CLOUD STORAGE ENVIRONMENT

RELATED APPLICATIONS

The present application is co-pending with and claims foreign priority to Indian Provisional Patent Application No. 2660/CHE/2011 entitled: "Architecture for Providing Tenant Based Storage Security and Service Level Assurance in Cloud Storage Environment," filed with the Indian Patent Office on August 3, the disclosure of which is incorporated by reference herein in its entirety.

BACKGROUND

Cloud computing is rapidly changing the Internet into a collection of clouds, which provide a variety of computing resources, storage resources, and, in the future, a variety of resources that are currently unimagined.

At present, storage system architectures in a cloud storage environment are monolithic in nature. A tenant is considered as a subscriber of some amount of storage in the cloud or an application who owns part of the shared storage environment. All the tenants will have one view of the storage file system tree. A storage system treats the connected storage as global and storage clients access their storage through the storage service end points such as Network File System (NFS), Common Internet File System (CIFS) and Internet Small Computer System Interface (iSCSI). The critical architectural issue here is that the connected storage is seen as one single file system tree by the storage system. Even though the storage tenant has a unique end point at which storage is accessed, each tenant processing environment in the storage system can access other tenants' file systems. This makes the tenant's storage vulnerable to security attacks and Denial-of-Service (DoS) attacks. Since the system has a global view of the storage, allocation of resources on the storage system, such as memory and CPU management, are not possible on a per tenant basis. The service level assurance of the storage service of a tenant by the storage system depends on how best the system resources (CPU, memory) are controlled on a per tenant basis.

Current generation storage system attempt to partially solve the above-mentioned issues using Logical Unit Number (LUN)-Masking techniques to some extent. However, LUN-Masking does not solve the security issue (confidentiality of tenant's data with respect to other tenants and tenant data manipulation by other client) completely. If the Host-Bus-Adapter (HBA) is compromised, any tenant can access and modify other tenant's data.

SUMMARY

Various embodiments of the invention provide techniques for tenant based storage security and service level assurance in a cloud environment. Specifically, and in one embodiment a method for tenant based storage security and service level assurance in a cloud environment is presented.

More particularly and in an embodiment, a request is received for access to a portion of shared storage, which is situated in a cloud environment. The request originates from a tenant, and the storage services multiple other tenants from the cloud environment. Next, a tenant storage machine (TSM) is dynamically instantiated and uniquely assigned to the tenant. Then, operating system (OS) resources for the TSM are

DETAILED DESCRIPTION

A "resource" includes a user, service, system, device, directory, data store, groups of users, a file, a file system, combinations and/or collections of these things, etc. A "principal" is a specific type of resource, such as an automated service or user that acquires an identity. As used herein a "principal" may be used synonymously and interchangeably with the term "tenant."

A "processing environment" defines a set of cooperating computing resources, such as machines (processor and memory-enabled devices), storage, software libraries, software systems, etc. that form a logical computing infrastructure. A "logical computing infrastructure" means that computing resources can be geographically distributed across a network, such as the Internet. So, one computing resource at network site X and be logically combined with another computing resource at network site Y to form a logical processing environment.

The phrases "processing environment," "cloud processing environment," "cloud environment," and the term "cloud" may be used interchangeably and synonymously herein.

Moreover, it is noted that a "cloud" refers to a logical and/or physical processing environment as discussed above.

The techniques presented herein are implemented in machines, such as processor or processor-enabled devices (hardware processors). These machines are configured and programmed to specifically perform the processing of the methods and systems presented herein. Moreover, the methods and systems are implemented and reside within a non-transitory computer-readable storage media or machine-readable storage medium and are processed on the machines configured to perform the methods.

It is within this context that embodiments of the invention are now discussed within the context of the FIGS. 1-6.

Figure 1:
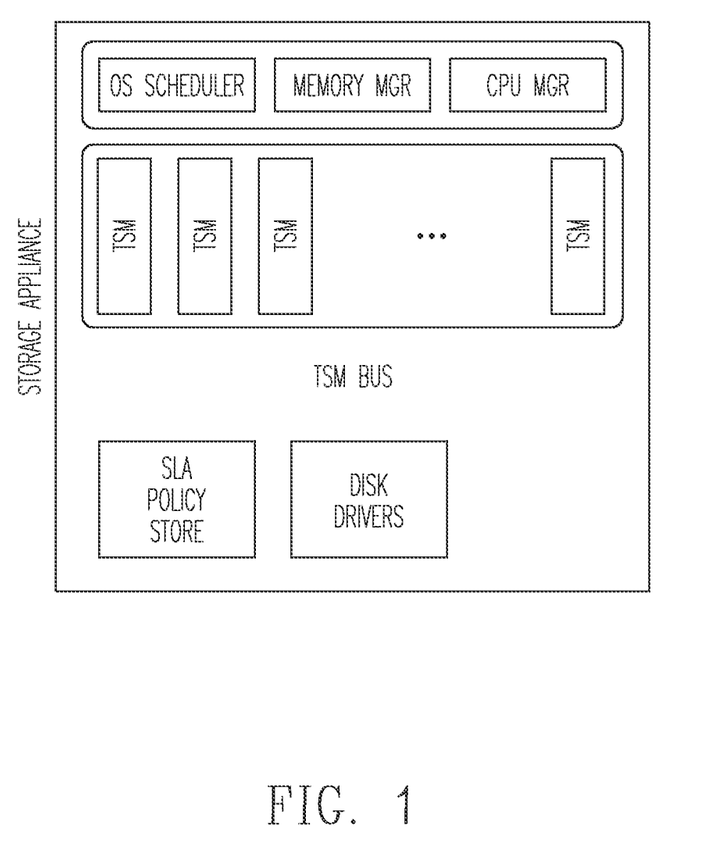
FIG. 1 is a diagram depicting architecture for a cloud storage environment capable of providing storage security and service level assurance on a per tenant basis, according to the techniques presented herein.

FIG. 1 is a diagram depicting architecture for a cloud storage environment capable of providing storage security and service level assurance on a per tenant basis, according to the techniques presented herein.

The FIG. 1 shows an architecture in which the tenants are provided with independent security and performance guarantees. Tenant requirements are typically defined in terms of service level assurances, which cover a variety of capabilities including security, performance, data protection and availability and data management. Service level assurances are designed to provide tenants with a foundation for the expected level of service from storage provider.

The virtual Tenant Storage Machine (TSM—and described in greater detail below with reference to the FIG. 2) provides storage service level assurances, such as per client Input Output per Sec (IOPS), per tenant throughput, per tenant latency. As the tenant services are run inside the TSM, the services are unaware of other tenant's services as if they are run on some other physical computer thus providing storage security.

The architecture of the FIG. 1 provides a plurality of TSMs, which provide a virtual storage environment coupled for each of the tenants in a cloud storage environment. Operating System (OS) resources are dynamically allocated to each of the TSMs to provide secure storage services and to manage service level assurances of the tenant. A secure storage service is achieved by isolating the TSMs. This is achieved by providing separate Internet Protocol (IP) addresses for each TSM and binding the tenant's data to Virtual Local Area Networks (VLAN) to ensure separation of network traffic.

The TSMs provide secure storage services as the processes under the TSM runs with root privileges. Root privileges are the powers that the root account has on the system. The root account is the most privileged on the system and has absolute power over the system (i.e., complete access to all files and commands). Among the root's powers are the ability to modify the system in any way desired and to grant and revoke access permissions (i.e., the ability to read, modify and execute specific files and directories) for other users, including any of those that are by default reserved for root.

The architecture of the FIG. 1 also includes a customized OS Scheduler, a memory manager and a Central Processing Unit (CPU) manager to manage the interaction with each TSM for the required resource management.

The architecture of the FIG. 1 also provides a Service Level Assurance (SLA) policy store managed by a system administrator, including the service level assurance policies configured for the tenant. Based on the SLA policies other components of the cloud storage environment provide required resource for each process running under the TSM. The OS scheduler communicates with the SLA policy store via TSM bus and provides required processing time for the processes running under the TSM. The CPU manager communicates with the SLA policy store via TSM bus and dynamically provides required CPU percentage for the processes running under the TSM at a given point of time. The memory manager communicates with the SLA policy store via TSM bus and provides required memory for processes processing under the TSM. Thus, the tenants are unaware of the other tenants processing environment. It is as if other tenants are running on some other computer when in fact the other tenants are not.

Figure 2:
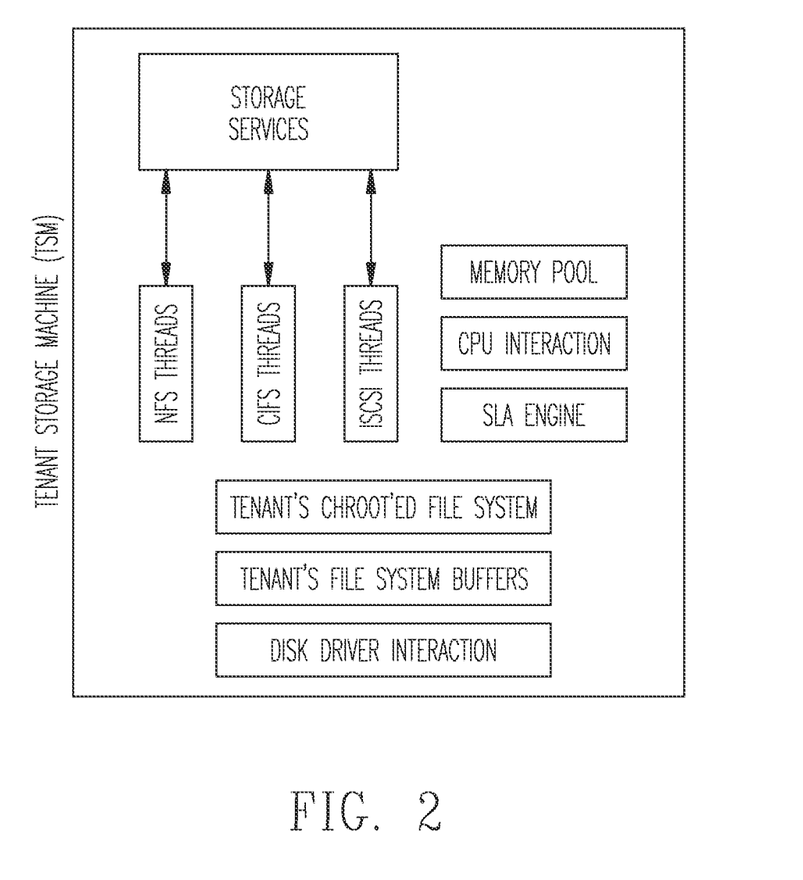
FIG. 2 is a diagram of a virtual storage tenant machine used in the cloud storage environment of the FIG. 1, according to embodiments presented herein.

FIG. 2 is a diagram of a virtual storage tenant machine used in the cloud storage environment of the FIG. 1, according to embodiments presented herein.

The TSM (FIG. 2) includes all the core modules used for providing a storage service for a tenant. Anyone who wants to communicate with TSM can do so through defined interfaces via the TSM Bus. The TSM includes one set of storage protocol options including NFS, CIFS and iSCSI to provide multiple classes of service for each tenant. In the TSM architecture (FIG. 2), each TSM includes independent storage services, which are run explicitly for one tenant on behalf of whom the TSM is provisioned. The TSM runs on a chrooted file system. A chroot on UNIX operating system is an operation that changes the apparent root directory for the current running process and its children in the TSM, which means that the processes that run inside the TSM can see a sub-tree as root file system. This phenomenon acts as the basis for the client security. Each client's process inside the TSM runs with root privileges but cannot access other client's file system data.

The TSM is in many ways analogous to the virtual machines of server virtualization, in that resources are dynamically shifted between TSMs. The SLA engine in the TSM interacts with CPU manager, SLA policy store, memory manager via the TSM bus and manages the file system buffers and storage services threads with the TSM. The SLA engine also learns about the current disk utilization and uses this information to achieve the desired IOPS rate.

Figure 3:
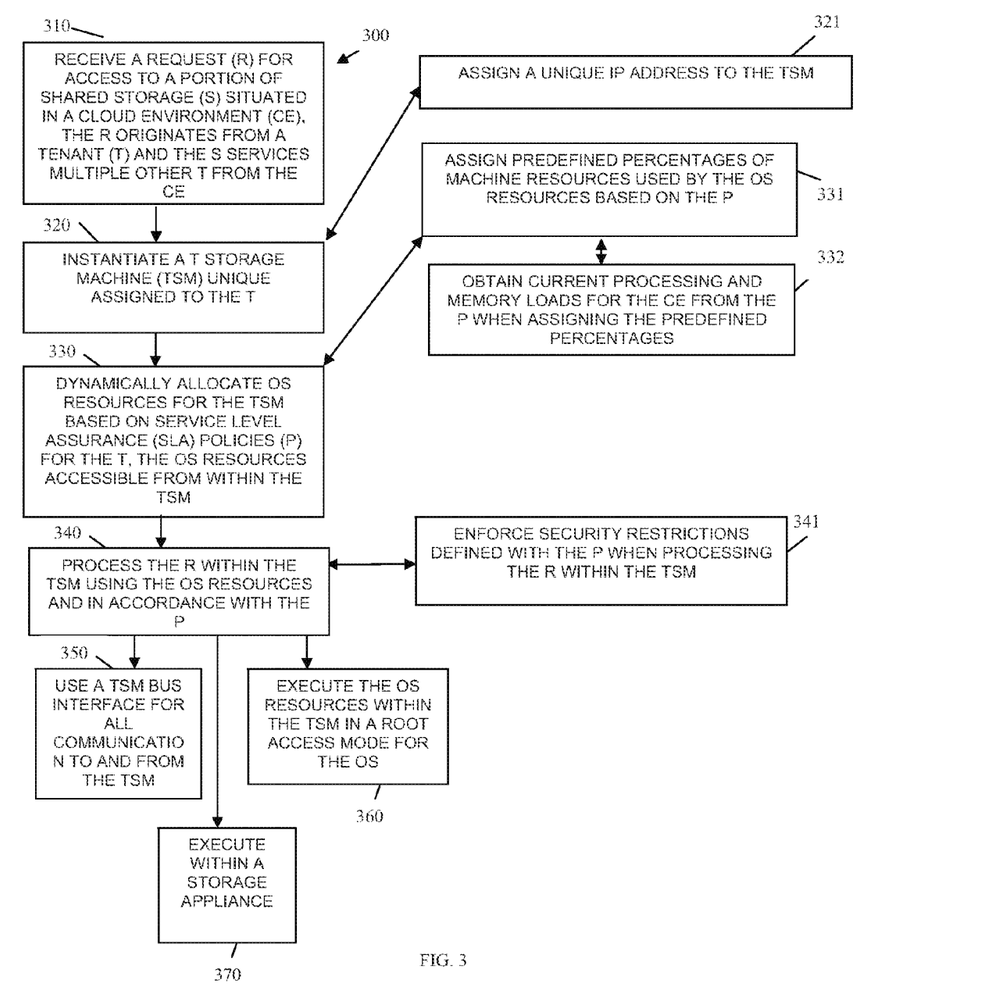
FIG. 3 is a diagram of a method for tenant-based storage security and service level assurance in a cloud storage environment, according to embodiments presented herein.

FIG. 3 is a diagram of a method 300 for tenant-based storage security and service level assurance in a cloud storage environment, according to embodiments presented herein. The method 300 (herein referred to as "tenant storage machine (TSM) service") is implemented, programmed, and resides within a non-transitory machine-readable storage medium that executes on one or more processors of a network. The network may be wired, wireless, or a combination of wired and wireless. In an environment, the TSM service executes as a virtual machine (VM) within a storage appliance.

At 310, the TSM service receives a request for access to a portion of shared storage situated in a cloud environment. The request originates from a tenant (a principal that can be user or automated service). Moreover, the shared storage services multiple other tenants (principals) from the cloud environment. So, a tenant is a principal that requests access to shared storage managed from the cloud environment. Different portions of the storage belong to or are accessible to particular tenants and access and management of the shared storage occurs via the TSM service as described herein above and below.

At 321, the TSM service instantiates a TSM, which is uniquely assigned to the tenant. It is to be noted that in some instances, the TSM service can uniquely assign and instantiate multiple TSMs to a single tenant. That is, each TSM is assigned to a particular tenant but a single tenant can have multiple assigned TSMs; in these cases each TSM can be uniquely assigned to a particular tenant based on the request, such that the tenant-request combination provides unique assignment of any instantiated TSM. So, each instantiated TSM belongs to a particular tenant but each tenant can have a single TSM or multiple TSMs (when the request is being used for unique assignments).

According to an embodiment, at 321, the TSM service assigns a unique Internet Protocol (IP) address to the TSM. This provides an addressing mechanism for communicating to and from each TSM.

At 330, the TSM service dynamically allocates OS resources for the TSM based on service level assurance (SLA) policies (discussed in detail above) for that tenant. The OS resources are accessible from within the processing environment of the TSM.

In an embodiment, at 331, the TSM service assigns predefined percentages of machine resources used or required by the OS resources and based on the SLA policies.

Continuing with the embodiment of 331 and at 332, the TSM service obtains current processing and memory loads (utilization metrics) for the cloud environment from the SLA policies when assigning the predefined percentages. In this instance, an SLA engine (as presented and discussed above with reference to the FIG. 2) provides dynamically updated policy details providing the current utilization metrics, which the TSM service dynamically obtains and uses when reserving the predefined percentages.

At 340, the TSM service processes the initial request within the TSM using the OS resources. This is done according to the strictures defined in the SLA policies.

In an embodiment, at 341, the TSM service enforces security restrictions defined within the SLA policies when processing the request within the TSM. So, tenant and/or request specific customized security restrictions can be enforced within the cloud environment by encapsulation of storage operations within the TSM and by custom enforcement of security defined in the SLA policies.

According to an embodiment, at 350, the TSM service uses a TSM bus interface for all communication to and from the TSM. In other words, no operation on the shared storage of the cloud environment can be processed without being handled by a TSM and any inter-communication (between TSMs) must be handled by the TSM bus interface, which is controlled by the TSM service.

In another situation, at 360, the TSM service executes the OS resources within the TSM in a root access mode (security role assignment) for the OS.

In still another case, at 370, the TSM service executes within a storage appliance of the cloud environment. That is, the shared storage controller includes or embeds the TSM service to ensure all I/O occurring with the shared storage is inspected and handled in some manner by the TSM service.

Figure 4:
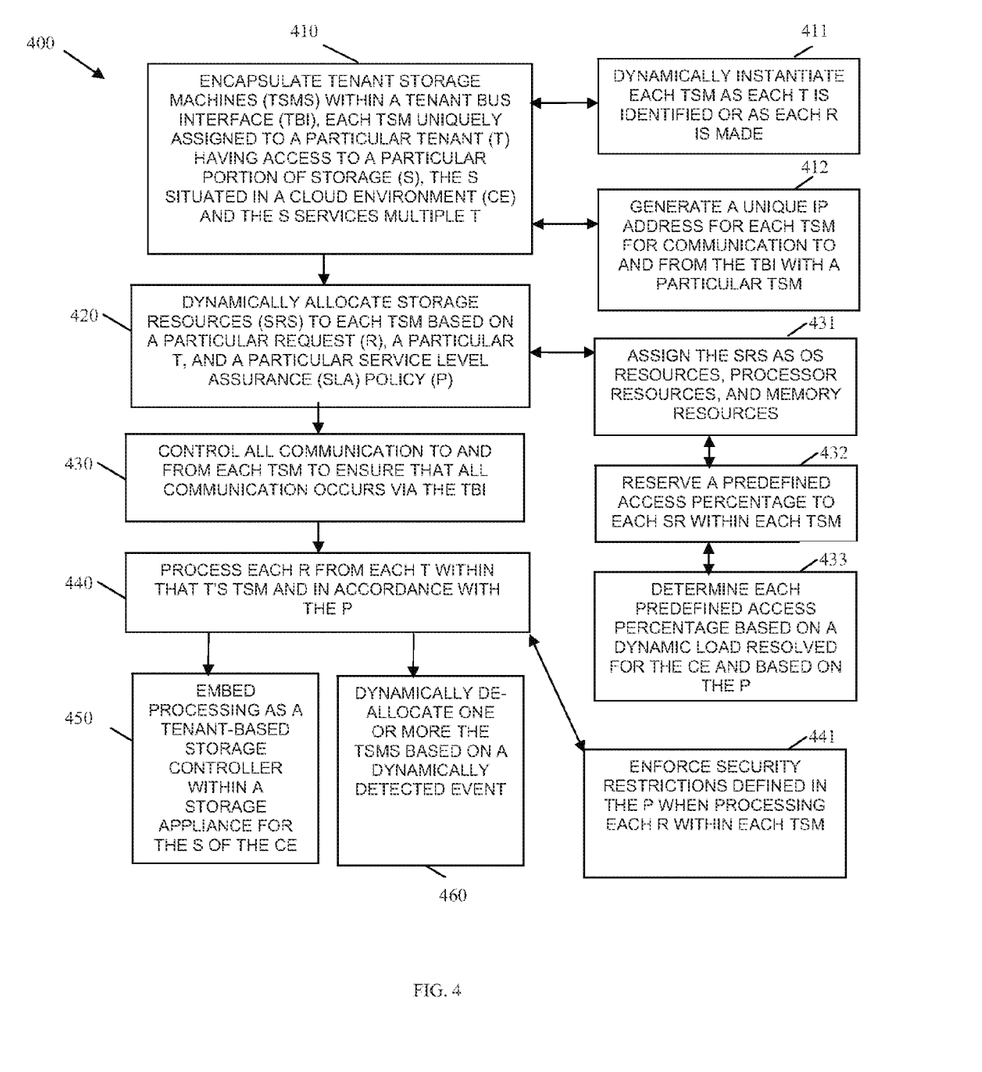
FIG. 4 is a diagram of another method for tenant-based storage security and service level assurance in a cloud storage environment, according to embodiments presented herein

FIG. 4 is a diagram of another method 400 for tenant-based storage security and service level assurance in a cloud storage environment, according to embodiments presented herein. The method 400 (herein referred to as "tenant storage machine (TSM) controller") is implemented, programmed, and resides within a non-transitory machine-readable storage medium that executes on one or more processors of a network. The network may be wired, wireless, or a combination of wired and wireless.

At 410, the TSM controller encapsulates TSMs within a tenant bus interface. Each TSM uniquely assigned to a particular tenant (although there can be multiple TSMs assigned to a same tenant but no single TSM is assigned to more than 1 tenant—this was discussed above with reference to the FIG. 3). Moreover, each TSM has access to a particular portion of the shared storage (as defined by policy for a given tenant). The shared storage is again situated in a cloud environment and the shared storage services multiple tenants over a network connection, such as but not limited to the Internet.

According to an embodiment, at 411, the TSM controller dynamically instantiates each TSM as each tenant is identified and/or as each request for storage access is made by a particular tenant.

In one situation, at 412, the TSM controller generates a unique IP address for each TSM. So, this provides addressable communication to and from the tenant bus interface with a particular TSM (the tenant bus interface encapsulates multiple TSMs).

At 420, the TSM controller dynamically allocates storage resources to each TSM based on a particular request, a particular tenant, and/or a particular SLA policy.

In an embodiment, at 431, the TSM controller assigns the storage resources as OS resources, processor resources, and/or memory resources.

Continuing with the embodiment of 431 and at 432, the TSM controller reserves a predefined access percentage to each storage resource within each TSM based at least in part on the SLA policies.

Still continuing with the embodiment of 432 and at 433, the TSM controller determines each predefined access percentage based on the dynamic load (utilization metrics), which is resolved dynamically for the cloud environment and again based at least in part on the SLA policies.

At 440, the TSM controller processes each request from each tenant within that tenant's TSM and in accordance with the strictures of the SLA policies.

In an embodiment, at 450, the TSM controller is embedded as a tenant based storage controller within a storage appliance for the shared storage of the cloud environment.

In one case, at 460, the TSM controller dynamically de-allocates one or more of the TSMs based on a dynamically detected event. So, each dynamically instantiated TSM and its allocated resources are freed in memory of the storage appliance when that TSM is no longer deemed to be of use or when it has not been used for some predetermined amount of time to free up system resources in the cloud environment. Any custom event can be tracked to trigger this de-allocation or memory.

Figure 5:
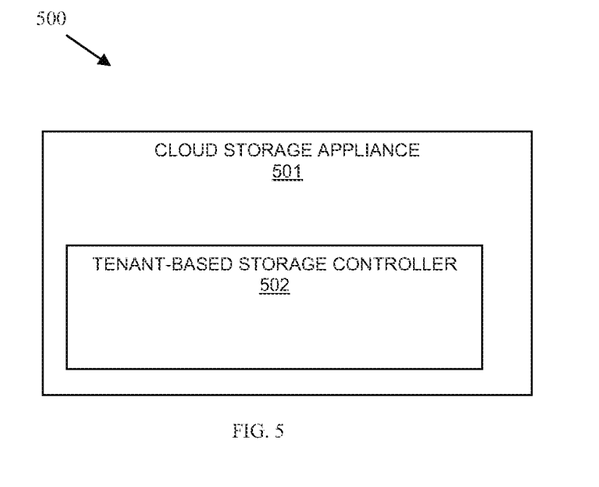
FIG. 5 is a diagram of a tenant controlled cloud storage system, according to embodiments presented herein.

FIG. 5 is a diagram of a tenant controlled cloud storage system 500, according to embodiments presented herein. The components of the tenant controlled cloud storage system 500 are implemented, programmed, and reside within a non-transitory machine-readable storage medium that executes on one or more processors of a network. The network may be wired, wireless, or a combination of wired and wireless.

In an embodiment, the tenant controlled cloud storage system 500 implements, inter alia, the processing associated with the methods 300 and 400 of the FIGS. 3 and 4, respectively using the architectures provided by the FIGS. 1 and 2.

The tenant controlled cloud storage system 500 includes a cloud storage appliance 501 and a TSM controller 502. Each of these and their interactions with one another will now be discussed in turn.

The cloud storage appliance 501 includes one or more processors, memory, and storage. The cloud storage appliance 501 is situated in a cloud environment and is an interface to cloud-based shared storage.

The memory of the cloud storage appliance 501 is configured with a TSM controller 502, which is implemented as executable instructions that process on the one or more processors of the cloud storage appliance 501.

The TSM controller 502 is configured to dynamically instantiate a TSM for a tenant that requests access to a portion of the shared storage controlled by the cloud storage appliance 501. Furthermore, the TSM controller 502 is configured encapsulate storage resources (includes storage service and operations) used in processing a request for access to the shared storage. Still further, the TSM controller 502 is configured to enforce custom security policies against the TSM.

The request is processed within the TSM and the TSM controller 502 is configured to handle multiple requests from multiple tenants that are attempting to access the shared storage of the cloud storage appliance 501. Moreover, each request from each tenant is handled by a uniquely instantiated TSM.

According to an embodiment, the TSM controller 502 is also configured to establish a tenant bus interface that handles all communication to and all communication from a particular TSM, via the tenant bus interface.

Continuing with the previous embodiment, the TSM controller 502 is also configured to resolve: the storage resources, a percentage of allocated use for each storage resource, and the custom security policies via interactions with a SLA policy repository.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method implemented in a non-transitory machine-readable storage medium and processed by one or more processors of a server machine configured to perform the method for dynamically allocating, controlling, and dedicating storage, comprising:

receiving, at the server machine, a request for access to a portion of shared storage situated in a cloud environment, the request that originates from a tenant and from the shared storage, services multiple other tenants from the cloud environment;

instantiating, on the machine, a tenant storage machine (TSM) uniquely assigned to the tenant, the TSM instantiated on the machine as a Virtual Machine (VM) isolated from other instances of the TSM on the machine operating as other VMs, the other instances of the TSM servicing the multiple other tenants;

dynamically allocating, on the server machine, operating system (OS) resources for the TSM based on service level assurance (SLA) policies for the tenant, the OS resources accessible from within the TSM, and the SLA policies provide guarantees to the tenant for security, performance, data protection, data availability, and data management, and where dynamically allocating further includes assigning predefined percentages of machine resources used by the OS resources based on the SLA policies, and where dynamically allocating further includes obtaining current processing and memory loads for the cloud environment from the SLA policies when assigning the predefined percentages; and processing, on the server machine, the request within the TSM using the OS resources and in accordance with the SLA policies providing the tenant access to the TSM.

2. The method of claim 1 further comprising, using, by the server machine, a TSM bus interface for all communication to and from the TSM.

3. The method of claim 1 further comprising, executing, by the server machine, the OS resources within the TSM in a root access mode for the OS.

4. The method of claim 1 further comprising, executing the method within a storage appliance which is the server machine.

5. The method of claim 1, wherein instantiating further includes assigning a unique Internet Protocol (IP) address to the TSM.

6. The method of claim 1, wherein processing further includes enforcing security restrictions defined with the SLA policies when processing the request within the TSM.

7. A method implemented in a non-transitory machine-readable storage medium and processed by one or more processors of a server machine configured to perform the method for dynamically allocating, controlling, and dedicating storage, comprising:

encapsulating, on the server machine, a plurality of tenant storage machines (TSMs) within a tenant bus interface, each TSM uniquely assigned to a particular tenant having access to a particular portion of storage, the storage that is situated in a cloud environment and the storage, services multiple tenants, and each tenant is unaware of remaining ones of the tenants to appear to each tenant that processing occurs on that tenant's own processing environment, each TSM encapsulated as a unique Virtual Machine (VM) isolated on the machine from the other TSMs, which are other VMs on the machine;

dynamically allocating, on the server machine, storage resources to each TSM based on a particular request, a particular tenant, and particular service level assurance (SLA) policies, and where dynamically allocating further includes assigning the storage resources as operating system (OS) resources, processor resources, and memory resources, and where assigning further includes reserving a predefined access percentage to each storage resource within each TSM, and where reserving further includes determining each predefined access percentage based on a dynamic load resolved for the cloud environment and based on the SLA policies;

controlling, on the server machine all communication to and from each TSM to ensure that all communication occurs via the tenant bus interface; and processing, on the server machine, each request from each tenant within that tenant's TSM and in accordance with the SLA policies providing each tenant access to that tenant's TSM.

8. The method of claim 7, wherein encapsulating further includes dynamically instantiating each TSM as each tenant is identified or as each request is made for storage.

9. The method of claim 7, wherein encapsulating further includes generating a unique Internet Protocol (IP) address for each TSM for communication to and from the tenant bus interface with a particular TSM.

10. The method of claim 7, wherein processing further includes enforcing custom security restrictions defined in the SLA policies when processing each request within each TSM.

11. The method of claim 7 further comprising, embedding the method as a tenant-based storage controller within a storage appliance for the storage of the cloud environment.

12. The method of claim 7 further comprising, dynamically de-allocating, by the server machine, one or more of the TSMs based on a dynamic detected event.

13. A system for segmented and dedicated storage controlled access, comprising:

a cloud storage appliance having one or more hardware processors, memory, and storage, the cloud storage appliance situated in a cloud environment; and the memory configured with a tenant-based storage controller implemented as executable instructions that process on the one or more hardware processors of the cloud storage appliance;

where the tenant-based storage controller is configured to dynamically instantiate a tenant storage machine (TSM) as a Virtual Machine (VM) for a tenant that request access to a portion of the storage, the TSM is configured to encapsulate storage resources used in processing a request for storage access and to enforce custom security policies against the TSM, the request is processed within the TSM and the TSM restricted to providing access to just the portion of the storage, the tenant-based storage controller configured to handle multiple requests and tenants accessing the storage, each request for each tenant handled by a uniquely instantiated TSM operating as a unique separate VM for that tenant and permitting each tenant controlled access to that tenant's TSM, where the tenant-based storage controller is configured to establish a tenant bus interface that handles all communication to and from a particular TSM via the tenant bus interface, and where the tenant-based storage controller is configured to resolve: the storage resources, a percentage of allocated use for each storage resource, and the custom security policies via a service level assurance (SLA) policy repository.

\* \* \* \* \*